United States Patent
Hori et al.

(10) Patent No.: US 10,533,410 B2
(45) Date of Patent: Jan. 14, 2020

(54) METHOD AND SYSTEM OF MODEL-BASED ACOUSTIC MEASUREMENTS FOR A PERFORATED CASING

(71) Applicant: Schlumberger Technology Corporation, Sugar Land, TX (US)

(72) Inventors: Hiroshi Hori, Sagamihara (JP); Ram Sunder Kalyanraman, Richmond, TX (US); Hiroshi Nakajima, Sagamihara (JP); Henri-Pierre Valero, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 176 days.

(21) Appl. No.: 15/550,039

(22) PCT Filed: Feb. 9, 2016

(86) PCT No.: PCT/US2016/017220
§ 371 (c)(1),
(2) Date: Aug. 10, 2017

(87) PCT Pub. No.: WO2016/130599
PCT Pub. Date: Aug. 18, 2016

(65) Prior Publication Data
US 2018/0023383 A1    Jan. 25, 2018

Related U.S. Application Data

(60) Provisional application No. 62/115,609, filed on Feb. 12, 2015.

(51) Int. Cl.
*E21B 47/00* (2012.01)
*G01V 1/40* (2006.01)
*G01V 1/50* (2006.01)

(52) U.S. Cl.
CPC .......... *E21B 47/0005* (2013.01); *E21B 47/00* (2013.01); *G01V 1/40* (2013.01); *G01V 1/50* (2013.01)

(58) Field of Classification Search
CPC ....... E21B 47/00; E21B 47/0005; G01V 1/40; G01V 1/50
See application file for complete search history.

(56) References Cited

U.S. PATENT DOCUMENTS 3,304,538 A    2/1967    Zill
3,401,772 A    9/1968    Kokesh
(Continued)

FOREIGN PATENT DOCUMENTS

| EP | 1672168 A1 | 6/2006 |
| WO | WO2014139593 A1 | 9/2014 |
| WO | WO2014165487 A2 | 10/2014 |

OTHER PUBLICATIONS

G.H. Pardue et al., "Cement Bond Log—A Study of Cement and Casing Variables", 1963, Journal of Petroleum Engineering, SPE 453 (11 pages).
(Continued)

*Primary Examiner* — Yong-Suk Ro
(74) *Attorney, Agent, or Firm* — Eileen Pape

(57) ABSTRACT

A method of model-based acoustic measurements for a wellbore comprises creating an interpretation chart of acoustic measurements by a downhole tool in a wellbore using a numerical modeling and performing an evaluation with respect to the wellbore based on the interpretation chart.

20 Claims, 16 Drawing Sheets

(56) References Cited

U.S. PATENT DOCUMENTS

| | | | |
|---|---|---|---|
| 4,709,357 A * | 11/1987 | Maki, Jr. | G01V 1/48 181/105 |
| 4,733,380 A | 3/1988 | Havira | |
| 4,742,496 A | 5/1988 | Jennings, Jr. et al. | |
| 4,757,479 A | 7/1988 | Masson et al. | |
| 6,333,700 B1 * | 12/2001 | Thomeer | E21B 23/00 166/254.2 |
| 9,823,376 B2 * | 11/2017 | Merciu | E21B 47/091 |
| 2006/0262644 A1 | 11/2006 | Schoepf et al. | |
| 2009/0168597 A1 * | 7/2009 | Wu | E21B 47/0005 367/35 |
| 2009/0272530 A1 | 11/2009 | Duguid et al. | |
| 2014/0052376 A1 | 2/2014 | Guo et al. | |
| 2015/0233236 A1 * | 8/2015 | Johnston | E21B 47/123 73/152.16 |

OTHER PUBLICATIONS

J. Juten et al, "Integration of Cement Job Data for Better Bond Index Interpretation", Production Operations Symposium, Oklahoma, Apr. 7-9, 1991, SPE 21690 (12 pages).

L.H. Gollwitzer et al., "The Cement Bond Tool", SPWLA twenty-third annual logging symposium, Jul. 6-9, 1982 (15 pages).

M.Grosmangin et al., "A Sonic Method for Analyzing the Quality of Cementation of Borehole Casings", 35th Annual Fall Meeting of SPE, Denver, Oct. 2-5, 1960 (7 pages).

T.H.Nayfeh et al., "The Fluid-Compensated Cement Bond Log", SPE Formation Evaluation, Aug. 1986, SPE 13044 (7 pages).

H.D. Brown et at., "New Development in Sonic Wave Train Display and Analysis in Cased Holes", SPWLA Eleventh Annual Logging Symposium, May 3-6, 1970 (25 pages).

B.Froelich et al., Cement Evaluation Tool—A New Approach to Cement Evaluation, SPE 1027, San Antonio, Oct. 5-7, 1983 (7 pages).

A.J.Hayman et at., "High-Resolution Cementation and Corrosion Imaging by Ultrasound", SPWLA 32nd Annual Logging Symposium, Jun. 16-19, 1991, (25 pages).

Offshore Permanent Abandonment, Oilfield Review Spring 2012, Schlumberger (9 pages).

International Search Report and Written Opinion issued in the related PCT Application PCT/US2016/017220, dated May 27, 2016 (13 pages).

International Preliminary Report on Patentability issued in the related PCT Application PCT/US2016/017220, dated Aug. 15, 2017 (9 pages).

* cited by examiner $\log_{10}(CBL)=(1-BI)\cdot\log_{10}(CBRA)+BI\cdot\log_{10}(MSA)$ ATTfp : CBL free-pipe attenuation MATT : Maximim attenuation at 100% cement bond BI : bond index $ATT = (1-BI) \cdot ATTfp + BI \cdot MATT$

METHOD AND SYSTEM OF MODEL-BASED ACOUSTIC MEASUREMENTS FOR A PERFORATED CASING

CROSS-REFERENCE TO RELATED APPLICATIONS

This application is based upon and claims the benefit of the priority of U.S. Provisional Application Ser. No. 62/115,609 entitled "MODEL-BASED CBL MEASUREMENTS IN PERFORATED CASING FOR P&A ACTIVITY" filed on Feb. 12, 2015, the disclosure of which is incorporated herein in its entirety by reference thereto.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure relates generally to methods and systems of model-based acoustic measurements for a perforated casing in a wellbore. In particular, the present disclosure relates to methods and systems of model-based cement bond log (CBL) measurements in a perforated casing for a plug and abandon (P&A) activity.

When an oil producing well is no longer profitable to oil companies, they take decisions to abandon the well after plugging the well, either temporarily or permanently depending on the economy and provision of redevelopment of the well. Permanent abandonment is called plug and abandon (P&A), as described in "Offshore Permanent Abandonment", Oilfield Review Spring 2012, Schlumberger. The P&A is costly operations in particularly in deep-sea market. Oil companies are liable to any catastrophic consequences in well integrity issues caused by poorly abandoned well even long time after abandonment, a reliable P&A process with its quality control is substantially important for both safety and environmental reasons.

One of the key and challenging processes of P&A operation is to set a cement plug in tubing or casing to ensure zonal isolation or no cross-flow behind the pipes. The method of setting the cement plug is to mil the casing (or tubing) before injecting cement in the depth interval where zonal isolation is intended. This milling operation requires highly weighted viscous mud to lift swarf (or steel debris) and drilled cement that may prevent multidirectional seal. The swarf-laden mud exceeds density that rock in milled section can withstands and leads to rock failure. Alternative to milling method, there is a process known as perforate, wash and cement (PWC) as described in "Offshore Permanent Abandonment", Oilfield Review Spring 2012. The process utilizes perforation guns to make holes, cleaning or washing out perforation debris before squeezing cement. Although the operation does not have risk of rock failure, there are uncertainties in status of perforated casing, in particularly the success of cement squeeze in term of hydrocarbon isolation.

Acoustic cement evaluation techniques such as an ultrasonic cement mapping, sonic cement bond log (CBL) and CBL-variable density Log (CBL-VDL) are present to be applied to an oil well for cement evaluation For example, the sonic Cement Bond Log (CBL) is developed in 1960s to evaluate casing/borehole cementing quality of oil wells as described in G. H. Pardue et al., "Cement Bond Log—A Study of Cement and Casing Variables", 1963, Journal of Petroleum Engineering, SPE 453 which is incorporated herein in its entirety by reference thereto. The CBL-VDL technique is described in H. D. Brown et al., "New Development in Sonic Wave Train Display and Analysis in Cased Holes", SPWLA Eleventh Annual Logging Symposium, May 3-6, 1970 which is also incorporated herein in its entirety by reference thereto.

However, these cement evaluation techniques are developed for the standard steel casings. Logging operation may be available in P&A wells, however, a problem raises in interpreting the data. Ultrasonic cement mapping provides localized (30-150 mm) cement quality behind casing, however, when casings are heavily perforated, more than half of casing surface is lost and there are uncertainties of ultrasonic response due to presence of perforation. The CBL can be used for measurements of cement quality in larger scale (60 mm-1000 mm) using casing extensional mode, however, there is no proper database to perform quantitative cement evaluation in a perforated casing.

As will become apparent from the following description and discussion, the present disclosure provides improved methods of sealing process in downhole applications.

SUMMARY OF THE DISCLOSURE

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect of the present disclosures, a method of model-based acoustic measurements for a perforated casing comprises creating an interpretation chart of acoustic measurements for a perforated casing in a wellbore using a numerical modeling, and performing an evaluation with respect to the perforated casing based on the interpretation chart.

In the method of the disclosure herein, the numerical modeling may comprise a finite difference method and/or a finite element method. The acoustic measurements may be sonic measurements or ultrasonic measurements.

In one embodiment of the method disclosed herein, the interpretation chart may be an interpretation chart of cement bond log (CBL) measurements with respect to the perforated casing and the evaluation may be a quantitative cement evaluation with respect to the perforated casing. The casing may comprise a special perforating casing, a customized perforating casing or equivalent pipes. The method may comprise estimating at least one of a CBL amplitude and a CBL attenuation. The method may also comprise setting data of conditions in free-pipe and 100% cemented cases with respect to both of a plain casing model and a perforated casing model for the numerical modeling. The method may further comprise detecting E1-peak amplitude of waveforms of a plain casing model and a perforated casing model in both of free-pipe and 100% cemented cases. The method may also further comprise computing a normalization factor using the E1-peak amplitude of waveforms of the plain casing model, and applying the normalization factor to the E1-peak amplitude of waveforms of the perforated casing model. The E1-peak amplitude in this document is used as a casing-borne signal that can be used for cement bond logging, in some cases this is typically the first dominant peak, but other embodiments may use alternatives such as peaks that arrive after the first peak or an envelope of casing-borne signals, depending on the measurement implementation.

In the method disclosed herein, the casing may be set a cement plug by a plug and abandon (P&A) operation and/or a perforate, wash and cement (PWC) operation. The method may further comprise receiving at least one of parameters of the casing and parameters of operation with respect to the casing. The method may also further comprise cumulating the cement evaluation results and the parameters in a database, and assessing the parameters or providing the amplitude for identifying perforation parameters so as to minimize impact on CBL measurements.

In another aspect of the present disclosures, a system of model-based acoustic measurements for a perforated casing comprises a computer apparatus and software instructions executable on the computer apparatus to create an interpretation chart of acoustic measurements for a perforated casing in a wellbore using a numerical modeling and perform an evaluation with respect to the perforated casing based on the interpretation chart.

In the system of the disclosure herein, the numerical modeling may comprise a finite difference method and/or a finite element method. The acoustic measurements may be sonic measurements or ultrasonic measurements.

In one embodiment of the system disclosed herein, the interpretation chart may be an interpretation chart of cement bond log (CBL) measurements with respect to the perforated casing and the evaluation may be a quantitative cement evaluation with respect to perforated casing. The casing may comprise a special perforating casing, a customized perforating casing or equivalent pipes. The software instructions may comprise an instruction to estimate at least one of a CBL amplitude and a CBL attenuation. The software instructions may also comprise an instruction to set data of conditions in free-pipe and 100% cemented cases with respect to both of a plain casing model and a perforated casing model for the numerical modeling. The software instructions may further comprise an instruction to detect E1-peak amplitude of waveforms of a plain casing model and a perforated casing model in both of free-pipe and 100% cemented cases. The software instructions may also comprise instructions to compute a normalization factor using the E1-peak amplitude of waveforms of the plain casing model and apply the normalization factor to the E1-peak amplitude of waveforms of the perforated casing model.

In the system disclosed herein, the casing may be set a cement plug by a plug and abandon (P&A) operation and/or a perforate, wash and cement (PWC) operation. The software instructions may further comprise an instruction to receive at least one of parameters of the casing and parameters of operation with respect to the casing. The software instructions may further comprise instructions to cumulate the cement evaluation results and the parameters in a database, and assess the parameters or providing the amplitude for identifying perforation parameters so as to minimize impact on CBL measurements.

In the present method and system, the evaluation may be an evaluation of gravel pack in the wellbore.

Advantages and novel features of the disclosures will be set forth in the description which follows or may be learned by those skilled in the art through reading the materials herein.

BRIEF DESCRIPTION OF THE DRAWINGS

Embodiments of a downhole apparatus and components thereof according to the disclosures herein are described with reference to the following figures. The same numbers are used throughout the figures to reference like features and components.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

The disclosure herein presents methodology and workflow to provide a new CBL interpretation chart using numerical modeling. The CBL measurement is based on a model in which casing-mode amplitude and its attenuation across a casing are linear function of a bond index (BI) defined in the foregoing Journal of Petroleum Engineering (SPE 453), i.e. a fraction of casing circumference bonded by cement. Providing expected free-pipe amplitude of a perforated casing in cement bonding conditions at two ends, i.e. BI=0 (free pipe) and BI=1 (100% good bond), cement evaluation in perforated casings becomes available.

The present method in the disclosure herein is useful to assess oil field operations/applications that require cement evaluation in a special/customized casing or equivalent pipes, including a casing for the P&A and/or WPC operation.

Figure 1:
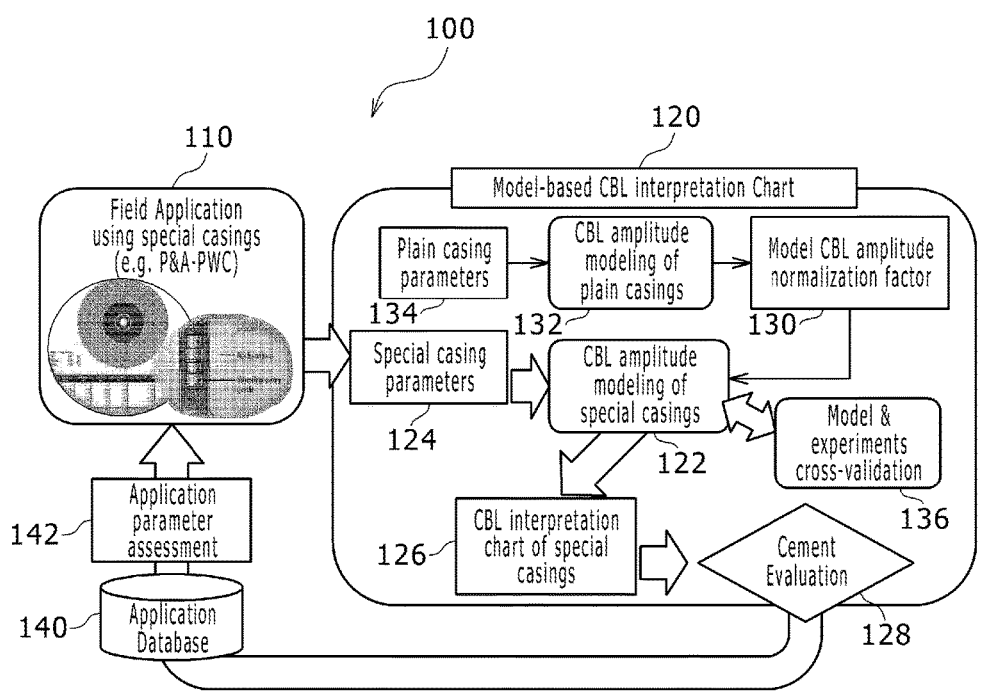
FIG. 1 depicts a schematic view of one example of a work flow and relation between a field application in well sites and creating a model-based CBL interpretation chart in accordance with embodiments of the present disclosure.

FIG. 1 summarizes one example of a work flow 100 and relation between a field application 110 in well sites and creating a model-based CBL interpretation chart 120 in the present disclosure. The field application 110 requires operations using special casings (for example, casings for P&A-PWC operation) of which cement bond evaluation is not available due to the absence of cement bond interpretation chart. The disclosure herein presents a numerical modeling 122 of CBL measurements in such special casings, which includes receiving candidate casing/operation parameters 124. Then, the new CBL interpretation chart 126 is generated using the numerical modeling 122 and cement evaluation 128 for the special casing is performed based on the CBL interpretation chart 126. The cement evaluation results and field operation parameters/results are cumulated in a database 140, and the application parameters are assessed 142.

The above-mentioned processes 110, 122-128, 140 and 142 may be iterated. The iterating of processes allows to improve and accelerate the development of field application 110 thanks to better understanding of observation. For example, in PWC application, users such as PWC operation and oil companies would like to assess PWC parameters to ensure zonal isolation after well abandonment. For example, in heavy perforation, i.e. large numbers and wider casing entry holes, it is required to ensure better cementing, however, a CBL amplitude for a special perforated casing by the heavy perforation largely deviates from the standard casing case. By using the model-based CBL interpretation chart 120 in the disclosure herein, it is capable of interpreting cement bonding of the perforated casing for quantitative cement bond evaluation. After PWC and CBL field operations, both of PWC/CBL measurements and the model-based interpretation chart, and final zonal isolation information may be cumulated in the database. Based on data stored in the database, it is capable of taking better decisions for next PWC operation to increase success rate of the operations.

In the present method, multiple parameter assessment for different operations 142 may be performed as the results. For example, in PWC operations, there are parameters for perforation, wash/cleaning and cementing. For example, there are parameters for perforation, such as casing hole entry diameters, number of shots per unit casing length, entry hole sizes in cement and formations. The numerical CBL modeling in the present disclosure is capable of providing a CBL amplitude, so that it is capable of identifying perforation parameters that gives the minimum impact on CBL measurements. In such case, the log of CBL measurements may be used as it is without preparing a custom interpretation chart for PWC operation. However, without having the present modeling results, such assessment is not available. The perforation parameters will affect to how perforation ability of removing debris (casing, cement and formation) and how well cement can be squeezed into annular space behind casings.

Referring to FIG. 1 again, in the present method in the disclosure herein, a model CBL normalization factor 130 may be computed and applied to the numerical modeling 122 of CBL measurements in the special casings. The model CBL normalization factor 130 may be computed based on a CBL amplitude modeling of plain casing (free-pipe) 132 using plain casing (free-pipe) parameters 134. Furthermore, the present method in the disclosure herein may include cross validation 136 between the present numerical CBL modeling and experiments of CBL measurements.

Although the present example are focused on CBL measurements for cement evaluation, however, depending on applications and a special casing used, the present method in the disclosure herein may be applied to ultrasonic measurements as described in the documents of B. Froelich et al., "Cement Evaluation Tool—A New Approach to Cement Evaluation", SPE 1027, San Antonio, Oct. 5-7, 1983, U.S. Pat. No. 4,733,380 and EP1672168, which are incorporated herein in its entirety by reference thereto. Moreover, it is capable of extending the present numerical modeling to ultrasonic, using detail model geometries and frequency that are suitable for ultrasonic measurements.

Hereinafter, more detailed examples of the present method in the disclosure herein are described with respect to model-based CBL measurements for quantitative cement evaluation in a perforated casing.

Figure 2A:
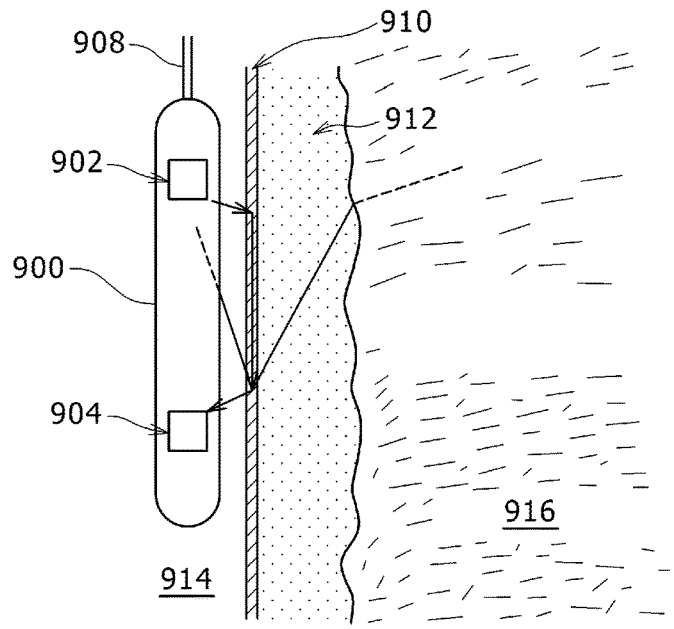
FIG. 2A depicts a schematic view of one example of CBL measurements using a CBL tool and FIG. 2B depicts a graph of one example of CBL-signal waveforms measured with the CBL tool.
Figure 2B:
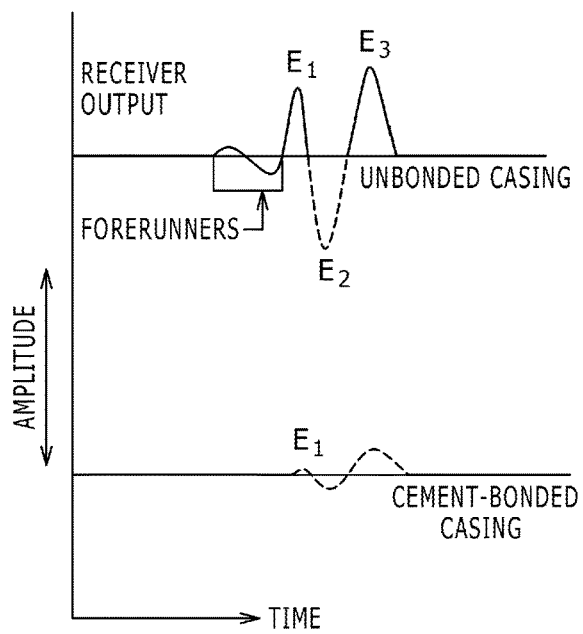

FIG. 2A shows one example of schematic configuration of CBL measurements using a CBL tool 900 and FIG. 2B shows one example of CBL-signal waveforms measured with the CBL tool 900. The CBL tool 900 used for evaluating cement bond between a perforated casing 910 and a bonded cement sheath 912 in a borehole 914 formed in a formation 916, which has an acoustic transmitter (pressure source) 902 and an acoustic receiver (pressure receiver) 904, is deployed in the borehole 914 by an armored cable 908. The CBL measurement is based on an acoustic pitch-catch technique, whereby an acoustic wave, which is excited by the acoustic transmitter (pressure source) 902, insonifies well fluid, couples into the perforated casing 910. A part of the wave propagates inside the perforated casing 910 toward the acoustic receiver 904, losing or reducing energy due to radiation or acoustic refraction to both well fluid 914, and formation 916, through the cement 912. The wave refracted to the receiver 904 is recorded in the tool 900 and transmitted using the armored cable 908 as a CBL signal.

The CBL tool measures an amplitude of the first dominant casing-borne signal, which is known as E-1 peak amplitude, as shown in FIG. 2B. The logarithmic magnitude of the E-1 peak amplitude is proportional to a bond index (BI), which is defined as a fraction of casing circumference bonded by the cement 912, as described in the document of M. Grosmangin et al., "A Sonic Method for Analyzing the Quality of Cementation of Borehole Casings", 35$^{th}$ Annual Fall Meeting of SPE, Denver, Oct. 2-5, 1960.

Figure 3:
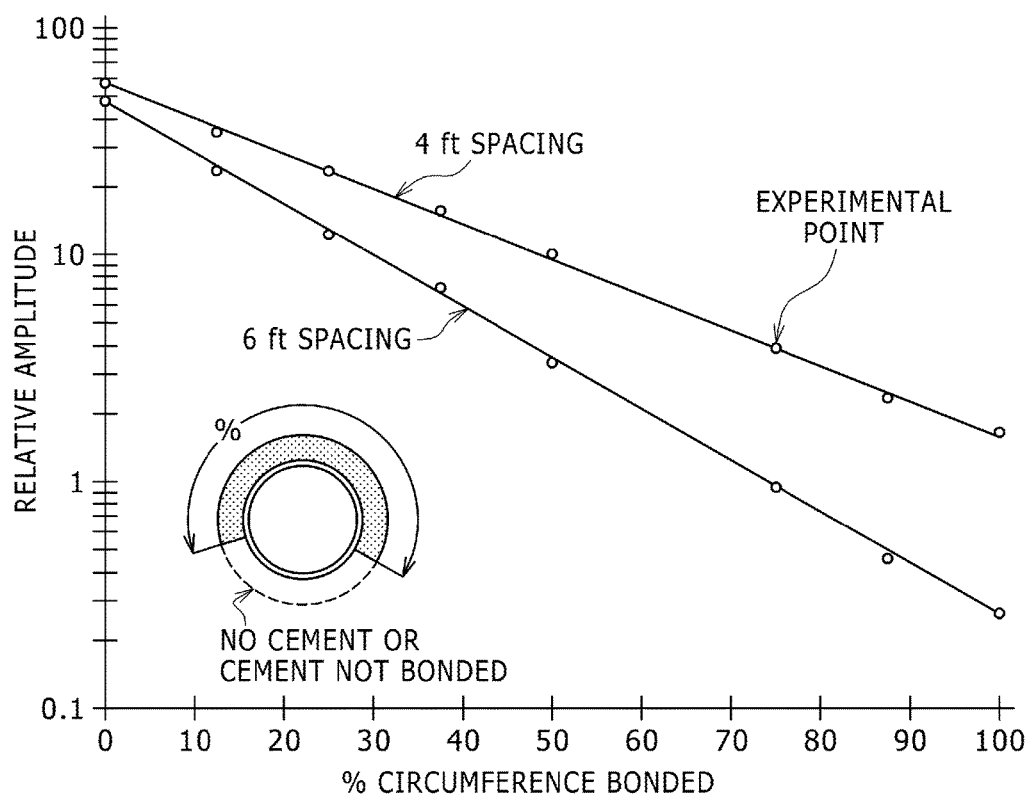
FIG. 3 depicts a graph of one example of E1-peak amplitude profile linear to circumferential cement bonding.
Figure 4:
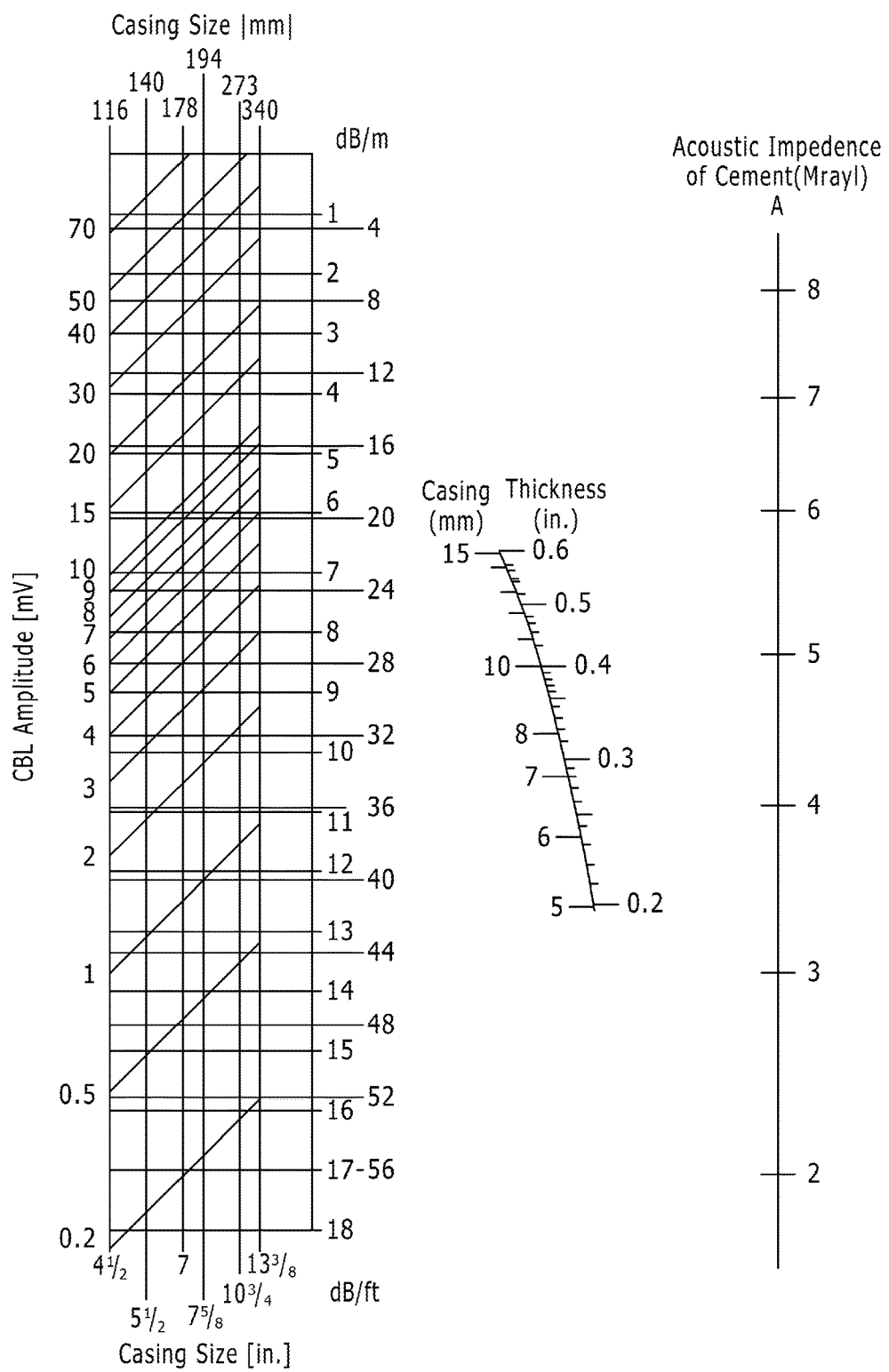
FIG. 4 depicts an example of a cement evaluation interpretation chart known as "M-1" chart.

The E1-peak amplitude is linear to circumferential cement bonding as shown in FIG. 3. The E1-peak amplitude and its decay is predictable when determining casing geometry (casing internal diameter and thickness), cement acoustic properties (acoustic impedance, product of density and compressional wave propagation speed), and referring to a nomogram of the E1-peak amplitude relating to cement bonding, or cement evaluation interpretation chart known as "M-1" chart shown in FIG. 4. The "M-1" chart is described in the document of J. Juten et al, "Integration of Cement Job Data for Better Bond Index Interpretation", Production Operations Symposium, Oklahoma, Apr. 7-9, 1991, SPE 21690, which is incorporated herein in its entirety by reference thereto.

Figure 5:
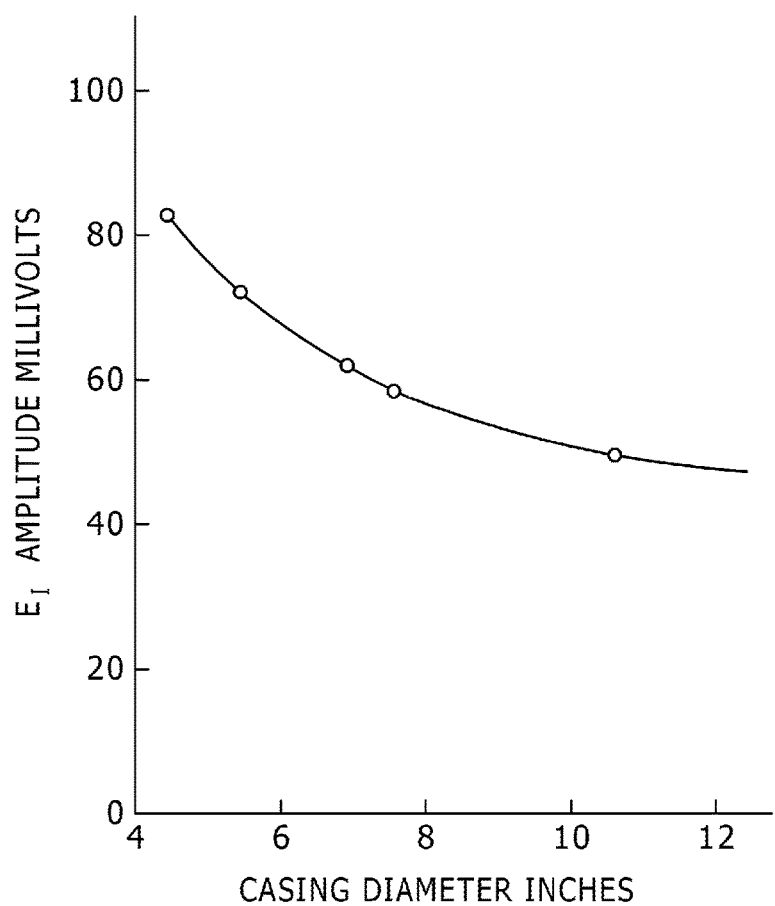
FIG. 5 depicts a graph of free-pipe reference amplitude as a function of casing diameter.
Figure 6:
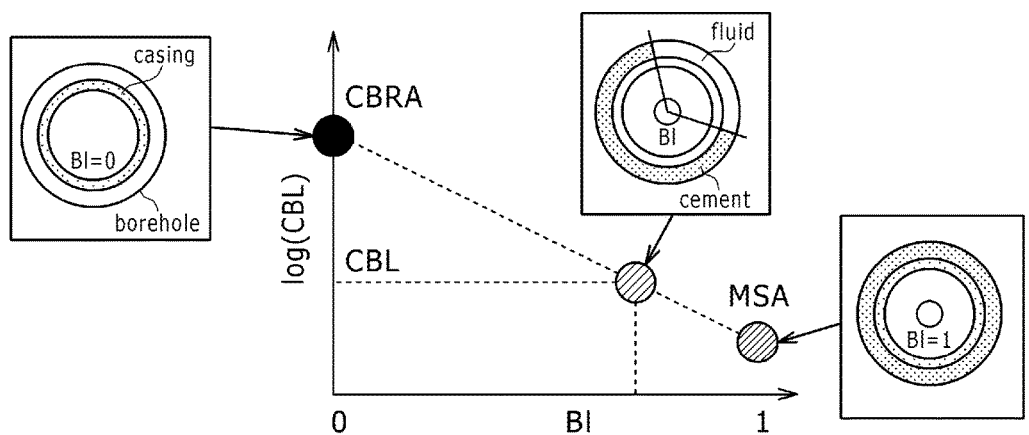
FIG. 6 depicts one example of a CBL interpretation chart in accordance with embodiments of the present disclosure.

The E1-peak amplitude for a free-pipe or E1-peak amplitude at BI=0 is obtained from a graph of CBL free-pipe reference amplitude (CBRA) as a function of casing diameter as shown in FIG. 5. Using the CBRA, it is capable of obtaining CBL amplitude at 100% cement bonding or the BI=1 (MSA: Minimum Sonic or 100%-bonded Amplitude). Using the CBL free-pipe reference amplitude (CBRA) and the CBL amplitude at 100% cement bonding, it is capable of estimating a bond index (BI) value from an arbitrary CBL amplitude between the CBRA and MSA as shown in FIG. 6.

In case of perforated casing, no free-pipe and 100% cement bonding amplitude data is available. The CBL free-pipe reference amplitude is originally an experimental data from one of the CBL tools in the standard casings in free-pipe state. As for E-1 peak attenuation at 100% cement bonding, no database is available from the same reason. Perforated casings are out of the scope of conventional CBL measurements.

Figure 7A:
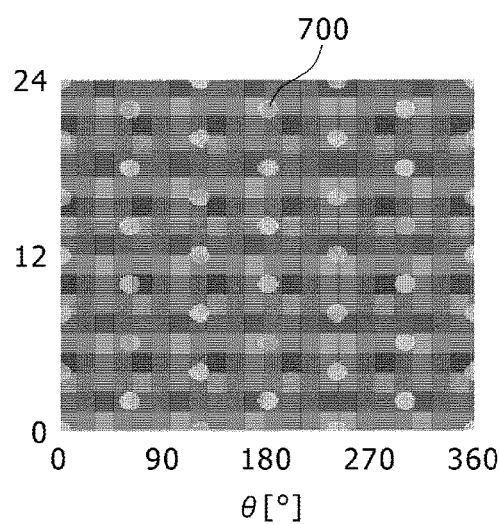
FIGS. 7A and 7B depict schematic views of examples of perforated casings at two different shot density in accordance with embodiments of the present disclosure.
Figure 7B:
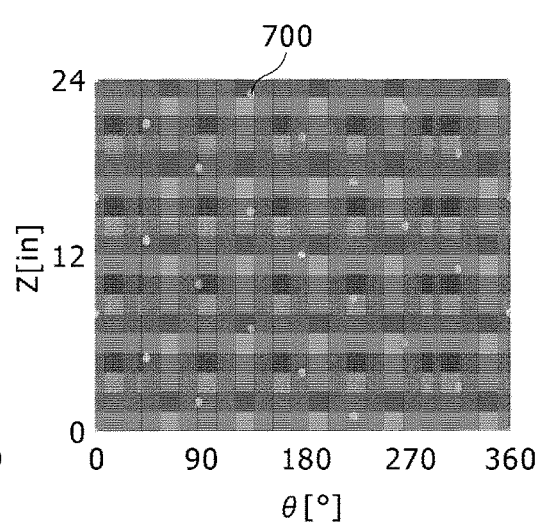

The CBL measurement utilizes a casing extensional mode for the measurements. The casing extensional mode in perforated casings varies as a function of shot density (numbers of perforation in unit length, e.g. spf or shot-per-foot) as shown in FIGS. 7A and 7B and individual casing entry hole diameter. FIGS. 7A and 7B show schematic views of the perforated casing with a plurality of perforated holes 700 distributed in the area of 24 inches in depth (Z) direction and 0-360 degrees in view angle ($\theta$) from the center of casing by the shot density of 18 spf and 12 spf, respectively. The casing becomes structurally compliant due to perforation.

In the present method in the disclosure herein, a customized interpretation chart of CBL measurements is built for various kinds of non-standard casing including perforated casings using a numerical modeling.

Figure 8:
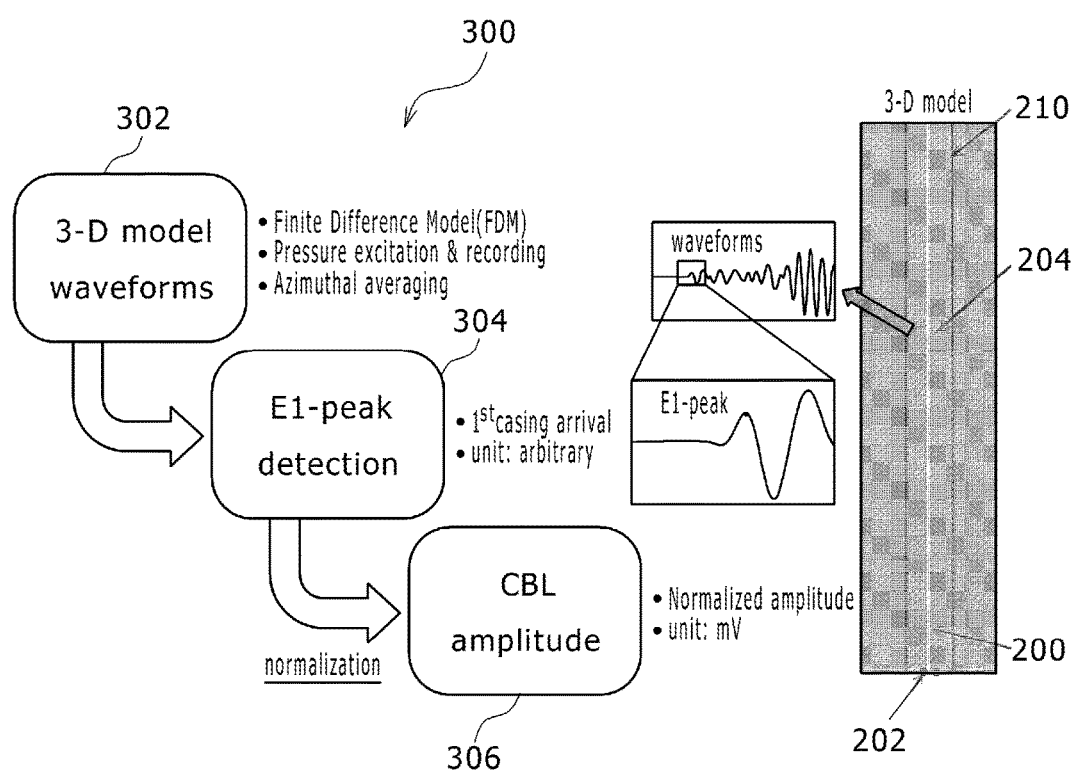
FIG. 8 depicts one example of a workflow to build a CBL interpretation chart using a numerical modeling in accordance with embodiments of the present disclosure.

FIG. 8 shows one example of a workflow 300 to build the interpretation chart of CBL measurements using a numerical modeling including a plurality of steps as described in the following (1) to (11).

(1) Numerical Modeling (Step 302 in FIG. 8):

A detailed model geometry along radial (R) and depth (Z) directions used for three-dimensional (3D) numerical modeling is built as one example illustrated in FIGS. 9A, 9B, 10A and 10B. Software for the numerical modeling can be in types. In the CBL modeling of free-pipe case shown in FIGS. 9A and 10A, a CBL tool 200 is deployed within a casing 210 and an outer area of the casing 210 and an area between the CBL tool 200 and the casing 210 are filled with brine 212. In the CBL modeling of 100%-bonded case shown in FIGS. 9B and 10B, a CBL tool 200 is deployed within a casing 210 and an area between the CBL tool 200 and the casing 210 is filled with brine 212, as same as the free-pipe case. However, the outer surface of casing 210 in the 100%-bonded case is fully bonded to a formation 216 by cement 214 unlike the foregoing free-pipe case.

In the present disclosure, an in-house software is used in one or more computer apparatuses, which is capable of being installed and performing various kinds of stress-velocity propagation in finite-difference time-domain (FT-DT) computation by executing the software. Alternatives may be commercial finite element code, such as LS-Dyna, Comsol and ANSYS.

Figures 9A, 9B:
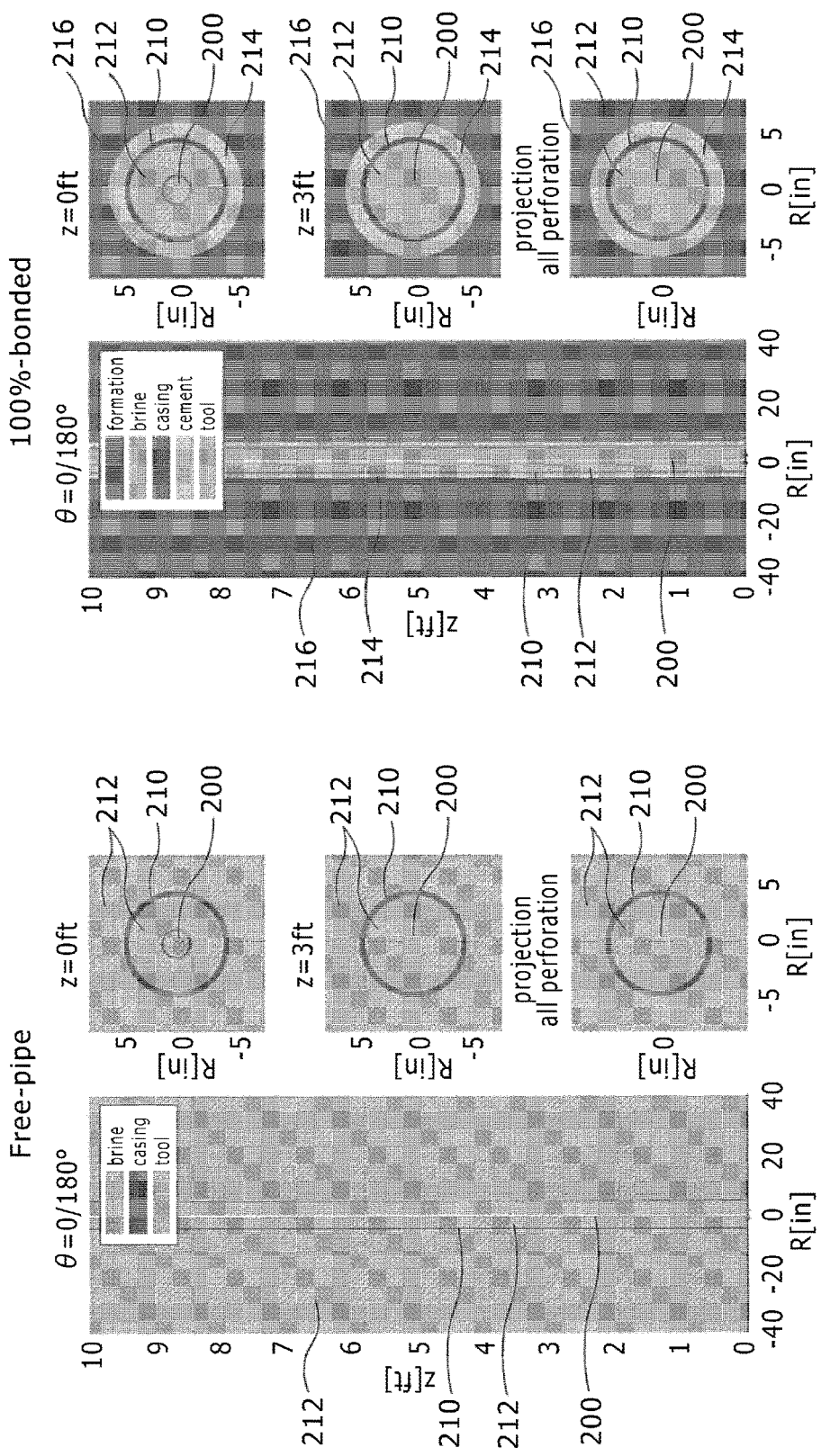
FIGS. 9A and 9B depict examples of detailed model geometry used for a numerical CBL modeling of a plain casing in each of free-pipe and 100%-bonded cases in accordance with embodiments of the present disclosure.

(1a) Plain Casing Model:

At least one model source of arbitrary field is input in the numerical modeling. The model source may be an acoustic pressure near a CBL frequency (for example 20 kHz). Similar to the actual CBL tool, waveforms of CBL signal and CBL amplitudes are simulated in plain casing under two conditions of free-pipe and 100% cement bonded, as illustrated in FIGS. 9A and 9B. The model outputs CBL signals recorded at the transmitter (pressure source)—receiver spacing of 3 ft in arbitrary amplitude.

Figures 10A, 10B:
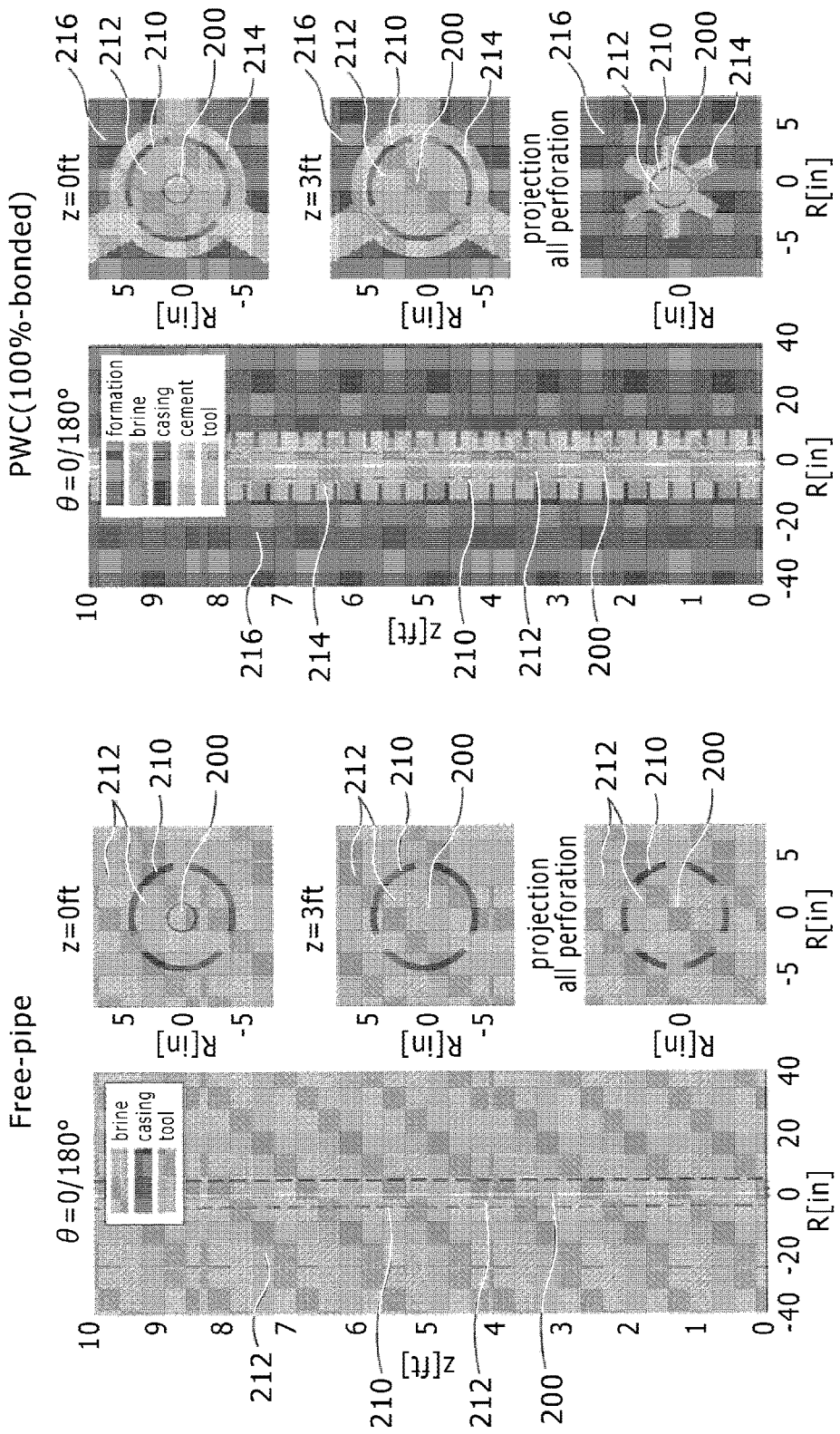
FIGS. 10A and 10B depict examples of detailed model geometry used for a numerical CBL modeling of a perforated casing in each of free-pipe and 100%-bonded cases in accordance with embodiments of the present disclosure.

(1b) Perforated Casing:

A 3D numerical model for a perforated casing is also built and model waveforms of CBL signal and CBL amplitudes are simulated in the perforated casing in two states, i.e., free-pipe and 100% cement bonded as one example illustrated in FIGS. 10A and 10B. Although free-pipe conditions data is not available in the actual P&A-PWC operation, it is required for CBL amplitude interpretation in perforated casings.

(2) E1-peak detection (Step 304 in FIG. 8):

E1-peak amplitude of model waveforms of the plain casing in the foregoing step (1-a) and the perforated casing in the foregoing step (1-b) are detected both in free-pipe and 100% cemented cases.

(3) Model CBL amplitude of Perforated Casing (Step 306 in FIG. 8):

A model CBL normalization factor, which is a CBRA ratio to the E-1 amplitude of plain free-pipe model in the foregoing step (1-a), is computed. Then, the normalization factor is applied to perforated casing models in the foregoing step (1-b), both in free-pipe and 100% cement bonded cases. The normalized values are referred as CBRA_P (perforated casing CBRA value) and MSA_PWC (minimum sonic amplitude after perforate, wash and cement).

Figure 11:
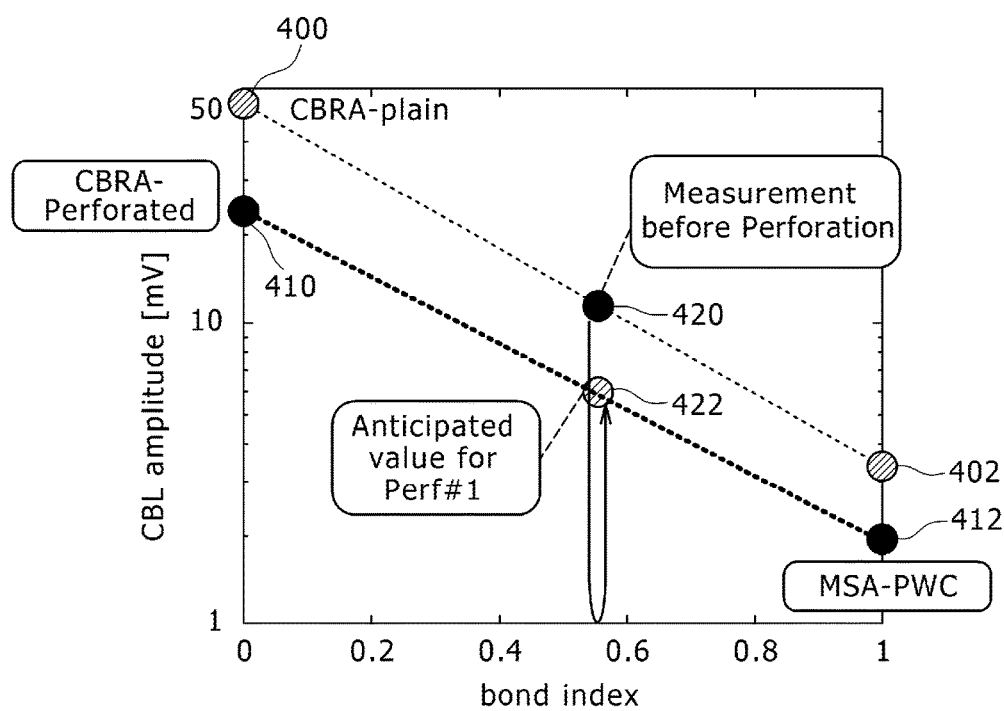
FIG. 11 depicts one example of a CBL interpretation chart of normalized CBL amplitudes as a function of bond index (BI) for a perforating casing in a P&A-PWC case in accordance with embodiments of the present disclosure.

(4) New CBL Chart for P&A-PWC:

The normalized CBL amplitudes are plotted in a two-dimensional (2-D) plot, referring to the bond index (BI), for both plain casing and perforated casing, as shown in FIG. 11. The CBL-amplitude data of CBRA (BI=0) and MSA (BI=1) for the plain casing are presented respectively as opaque circles 400 and 402 at BI=0 and 1 in FIG. 11. The CBL-amplitude data of CBRA (BI=0) and MSA (BI=1) for the perforated casing in free-pipe (CBRA_P at BI=0) and 100%-bonded (MSA_PWC at BI=1) are presented respectively as clear circles 410 and 412 at BI=0 and 1 in FIG. 11.

(5) Anticipated CBL amplitude after PWC operation:

CBL log is usually interpreted using the cemented plain casing amplitude. At one depth, CBL amplitude is obtained at the amplitude shown by circle 420 in FIG. 11. Bond Index (BI) of the plain casing before perforation is computed; the BI=BIx is assumed. After PWC (perforate, wash and cement) operation, an anticipated CBL amplitude at BI=BIx is CBL-PWC, which is presented as a circle 422 in FIG. 11. After successful cementing, the CBL-PWC amplitude is expected to be MSA-PWC shown by the circle 412 in FIG. 11. Based on a model-derived interpretation chart in FIG. 11, CBL-PWC amplitude is converted to anticipated CBL amplitude at BI=BIx, defined herein CBLa, as shown by the circle 420.

(6) Interpretation:

At the depth discussed in aforementioned document of 35$^{th}$ Annual Fall Meeting of SPE, Denver, if the CBL tool observes three different CBL amplitudes which are satisfy conditions (6a)-(6c) respectively as indicated below, it is capable of interpreting CBLa amplitude after PWC operation, in comparison to the original CBL amplitude before PWC operation, defined herein CBLo, and using the CBL interpretation chart of plain casing (CBRA, MSA). Alternatively, CBL-PWC amplitude can also be interpreted using CBRA-PWC and MSA-PWC as detailed and described below;

(6a) CBLa>CBL

Casing to cement bonding is degraded by perforation or by PWC operation.

(6b) CBL-PWC>MSA_PWC$^{0.8}$*CBRA_PWC$^{0.2}$ or CBLa>MSA$^{0.8}$*CBRA$^{0.2}$

Perforated casing bond index is smaller than 0.8, indicating not good bond.

(6c) MSA_PWC$^{0.8}$*CBRA_PWC$^{0.2}$>CBL-PWC>MSA_PWC or
MSA$^{0.8}$*CBRA$^{0.2}$>CBLa>MSA

Perforated casing cement bond index is larger than 0.8, indicating a good bond.

Figure 12:
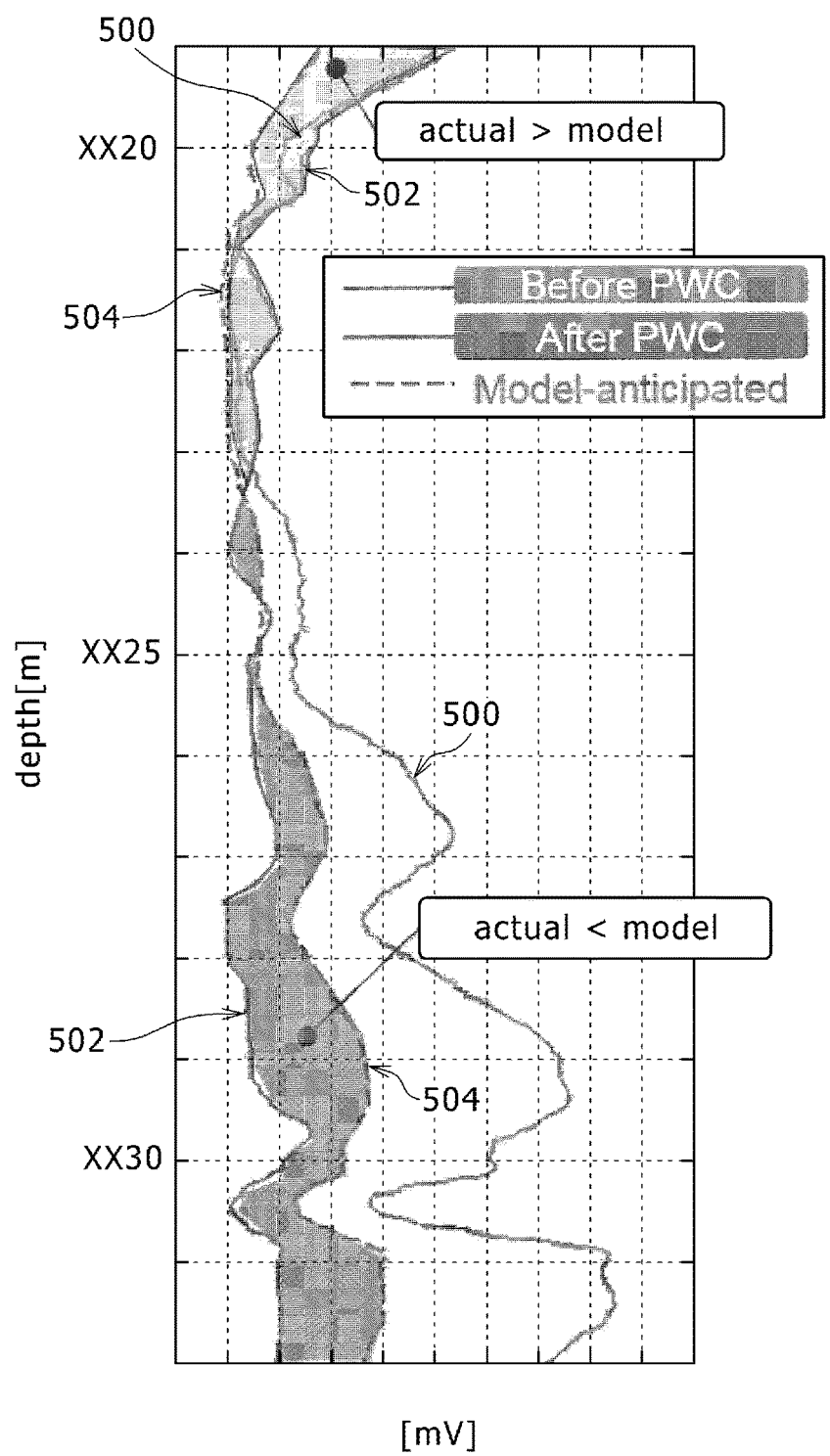
FIG. 12 depicts log examples of CBL amplitudes recorded before and after a PWC operation in accordance with embodiments of the present disclosure.

(7) Data comparison, CBL measurements vs. model-anticipated values:

Log examples of CBL amplitudes recorded before and after PWC operation are presented in FIG. 12. Curves 500 and 502 shows respective CBL amplitude in 20m depth interval before and after PWC. Horizontal axis is amplitude which increases from the left to right. Dashed line 504 shows model-anticipated CBL-PWC value after perforation. Comparing anticipated value indicated by dashed line 504 and measured value by solid line 502, it is capable of finding depth interval where cement bonding is improved and deteriorated.

Figure 13:
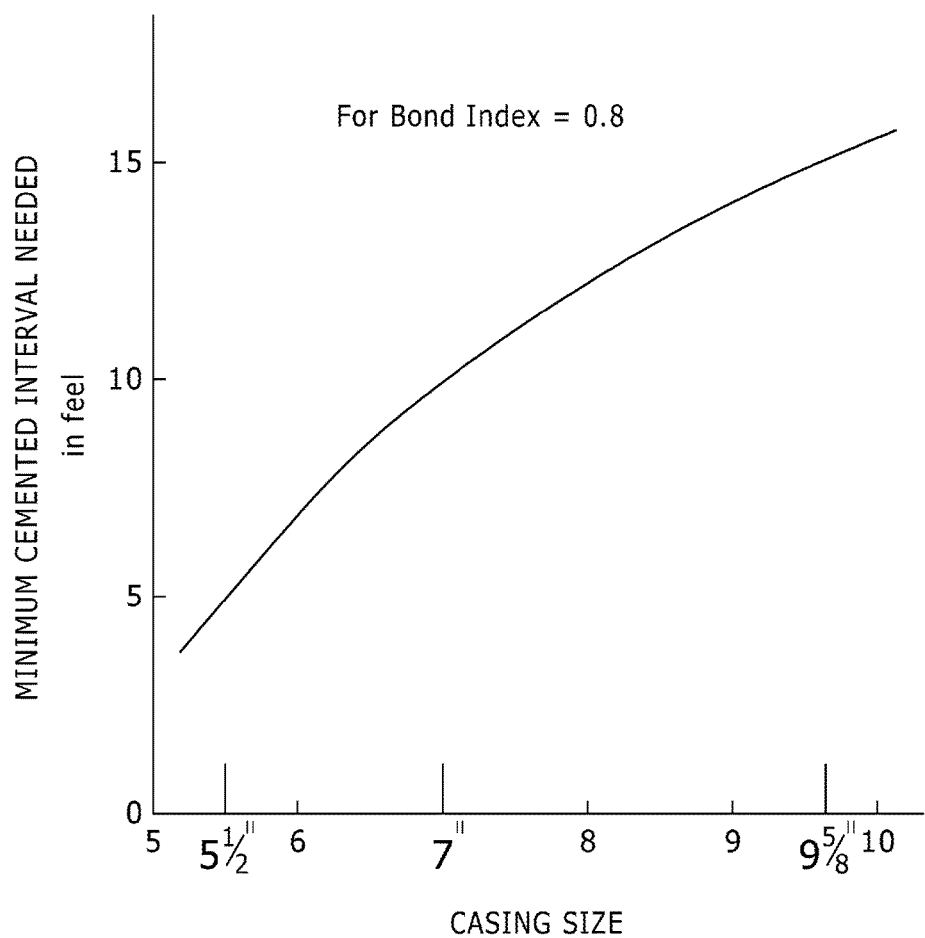
FIG. 13 depicts one example of the minimum cement interval (MCI) for different casing sizes.

(8) MCI for P&A:

Goal of CBL measurements is to confirm zonal isolation. A MCI (minimum cement interval is one of the parameters to define required good cementing interval in depth interval (unit: feet in this example) for different casing sizes (unit: inch), as shown in FIG. 13. The MCI is described in the document of H. D. Brown et at., "New Development in Sonic Wave Train Display and Analysis in Cased Holes", SPWLA Eleventh Annual Logging Symposium, May 3-6, 1970, which is incorporated herein in its entirety by reference thereto. Good bonding is defined by BILI, bond index limit and usually BILI=0.8 is conventionally used. BILI=0.8 is for the standard casing, and it is supposed to be applicable to P&A operation. CBL-PWC interpretation may be continuously applied to the actual data and MCI for P&A operation may be eventually found out.

(9) Data and Perforation QC—Slowness & Transit Time:

DT or slowness of CBL casing mode is useful to identify a perforated interval and significance of perforation on CBL measurements, as described in the aforementioned document of Journal of Petroleum Engineering (SPE 453). Plain casings present slowness value typically in the range of about 57.5 to 58.5 µs/ft. Perforated casings present slowness values that varies from 57.5 to 61 µs/ft in the model examples presented in this document, possibly even larger in case in which the casing is even more heavily perforated. As the results of slowness increase, TT (Transit Time) is also delayed in the order of 10 µs at the T-R (transmitter-receiver) spacing of 3 ft.

Figure 14:
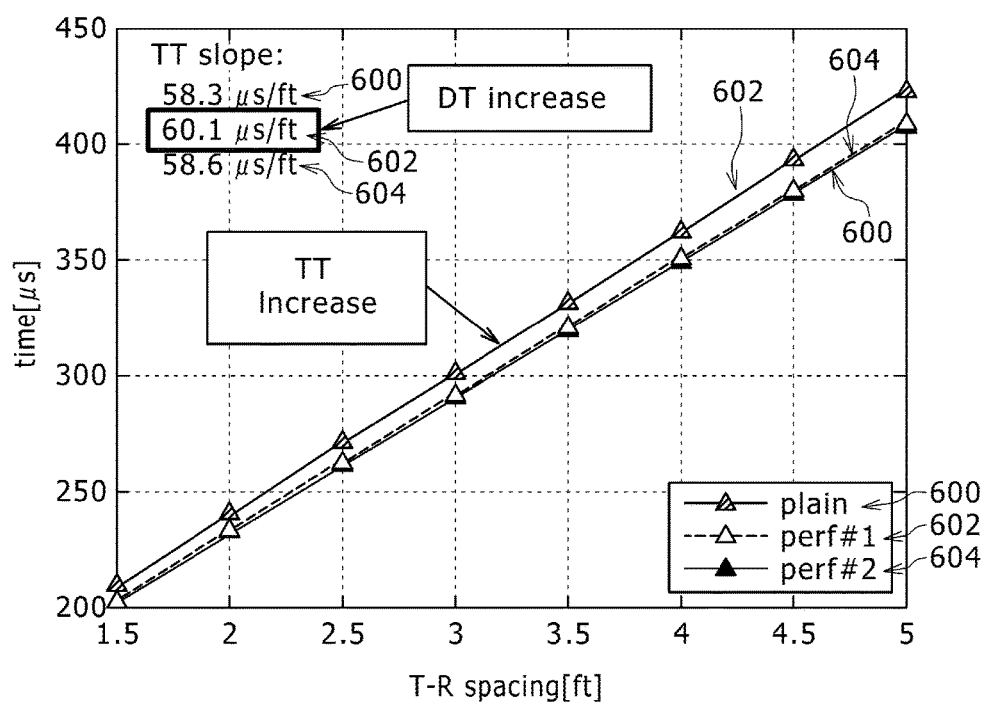
FIG. 14 depicts one example of TT (Transit Time) and DT(=slope of TT) data.

FIG. 14 shows one example of TT (Transit Time) and DT(=slope of TT) data in a heavily perforated casing. In FIG. 14, data indicated by curve 602 shows TT versus T-R spacing curve of a heavily perforated casing, named "perf#1". Compared with the standard casing of the same diameter or lightly perforated casing, which are indicated by curves 600 and 604 respectively, the data of heavily perforated casing shows TT increase and DT(=slope of TT) as indicated in the top-left corner of the graph (FIG. 14). Increase of slowness and TT values identify significance of perforation effect as the deviation from that of plain casing, together with amplitude.

(10) Alternative Measurements:

Same as CBL measurements in standard casings, attenuation measurements are also available and effective as an alternative sonic cement evaluation to the amplitude-based CBL measurements, in particularly when there are significant uncertainties in fluid and environmental effects, such as highly acoustically attenuative oil-base and synthetic oil-base muds and under high pressure and temperature, as described in the document of T. H. Nayfeh et al., "The Fluid-Compensated Cement Bond Log", SPE Formation Evaluation, August 1986, SPE 13044 which is incorporated herein in its entirety by reference thereto.

Figure 15:
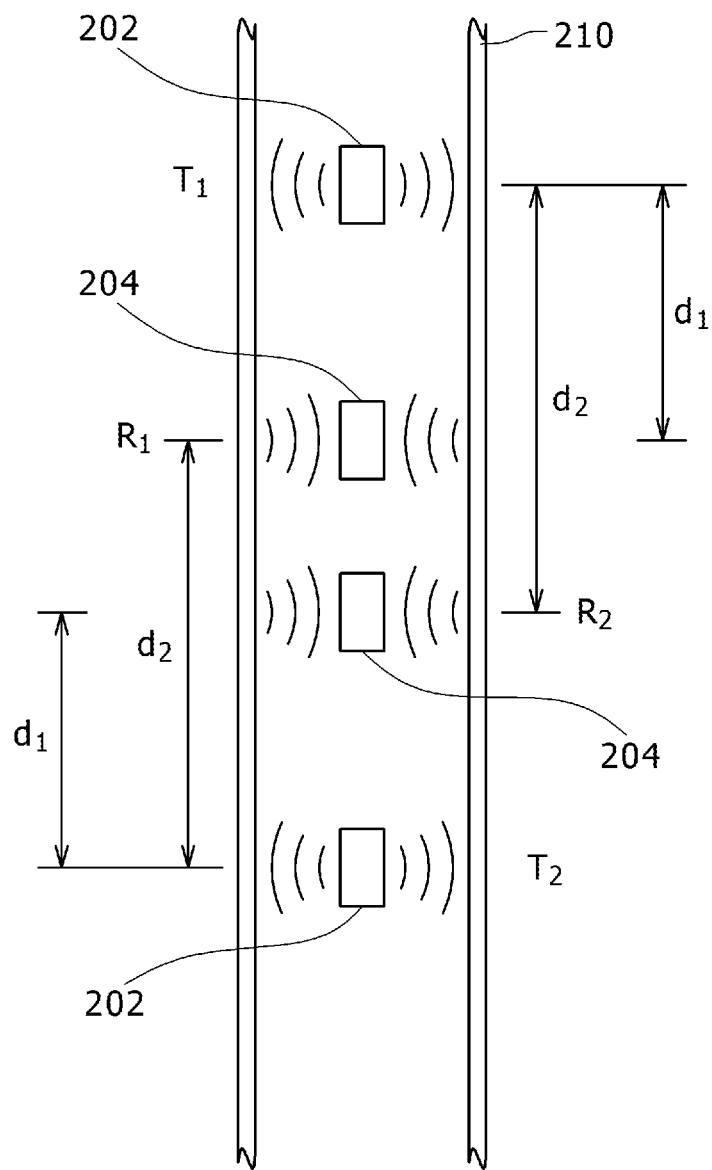
FIG. 15 depicts a schematic view of one example of casing mode attenuation by CBL tool in a borehole compensated configuration (BHC)

CBL amplitude measurements depend on acoustic pressure excitation and key properties (foe example, capacitance, sensitivity, etc.) of transducers such as transmitter (pressure source) and receiver, which usually have non-negligible sensitivity to environment. Discriminated or attenuation-based CBL measures casing mode attenuation using at least two pairs of transmitter (pressure source) 202 and two receivers 204 deployed within a casing 210 in a borehole compensated configuration (BHC) as shown in FIG. 15, as described in the documents of L. H. Gollwitzer et al., "The Cement Bond Tool", SPWLA twenty-third annual logging symposium, Jul. 6-9, 1982 and U.S. Pat. No. 4,757,479, which are incorporated herein in its entirety by reference thereto. Array sonic receivers may be also used to derive the casing mode attenuation as the E-1 magnitude gradient across the array. Attenuation measurements are immune to fluid property and environmental effects as they are cancelled out by BHC measurements.

Casing mode attenuation, as described in the aforementioned document of Production Operations Symposium, Oklahoma, Apr. 7-9, 1991, SPE 21690, has sensitivity to cement properties, Bond Index and perforation (density and entry hole diameter), so that it is capable of identifying cement bonding status of perforated casings, same as or superior over amplitude-based CBL measurements.

The casing mode attenuation may be computed by conducting CBL modeling using multiple receivers, for example, at 3.5 ft-4.5 ft or 3 ft-5 ft transmitter-receiver (T-R) spacing. From two CBL amplitude at known R-R spacing (respectively 1 and 2 ft), the attenuation value can be computed.

Figure 16:
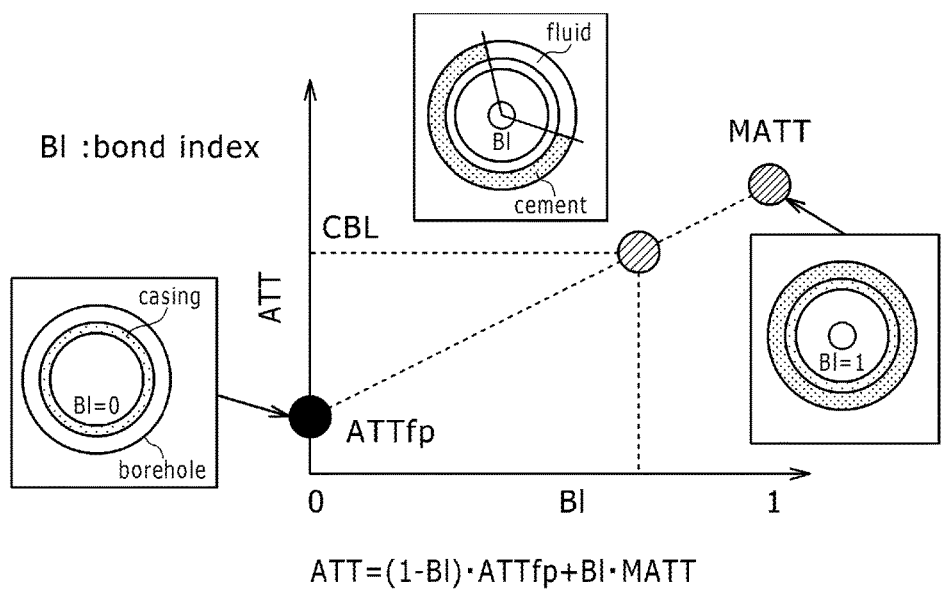
FIG. 16 depicts a schematic view of one example of a linear relation between casing mode attenuation (ATT) and bond index (BI).

FIG. 16 shows one example of a linear relation between casing mode attenuation (ATT) and bond index (BI). The mode attenuation may be computed in two state, free-pipe state and 100%-cement-bond state, which are respectively named as ATTfp (free-pipe attenuation) and MATT (maximum attenuation). At one bond index (BI), casing presents ATT as linear relation, as shown by an equation of ATT=(1−BI)*ATTfp+BI*MATT. For perforated casing, the numerical modeling in the disclosure provides ATTfp_PWC and MATT_PWC, respectively attenuation of perforated casing in free-pipe and 100% cement bonding states.

(11) Acoustic Logging Tool Usage to Downhole Applications out of Standard Cement Evaluation:

There is an application of an acoustic logging tool such as a CBL tool other than the standard cement evaluation, such as an evaluating gravel pack quality utilizing acoustic measurements with an acoustic logging tool as described in U.S. Pat. No. 4,742,496. The quantitative analysis or model-based interpretation in the present method in the disclosure can be applied to the application other than the standard cement evaluation cases.

Conventional CBL measurements are provided at sonic logging frequency, typically near 20 kHz. Casing extensional models can be excited at higher frequency, for example, 100 kHz or 200 kHz, therefore, embodiments of the model-based interpretation development method are not limited to just the conventional CBL at a conventional frequency, but also include higher frequencies.

The preceding description has been presented only to illustrate and describe certain embodiments. It is not intended to be exhaustive or to limit the disclosures to any precise form disclosed. Many modifications and variations are possible in light of the above teaching.

The embodiments and aspects were chosen and described in order to best explain principles of the disclosures and its practical applications. The preceding description is intended to enable others skilled in the art to best utilize the principles in various embodiments and aspects and with various modifications as are suited to the particular use contemplated. It is intended that the scope of the disclosures be defined by the following claims.

What is claimed is:

1. A method of model-based acoustic measurements for a perforated casing, comprising:
   creating an interpretation chart of acoustic measurements for a perforated casing in a wellbore using a numerical modeling, wherein the interpretation chart is an interpretation chart of cement bond log (CBL) measurements with respect to the perforated casing;
   performing an evaluation with respect to the perforated casing based on the interpretation chart; and
   making a decision based on the evaluation for zonal isolation in the perforated casing.

2. The method according to claim 1, wherein the numerical modeling comprises at least one of a finite difference method and a finite element method.

3. The method according to claim 1, wherein the acoustic measurements is sonic measurements or ultrasonic measurements.

4. The method according to claim 1,
   wherein the evaluation is a quantitative cement evaluation with respect to the perforated casing.

5. The method according to claim 1, wherein the casing comprises a special perforating casing, a customized perforating casing or equivalent pipes.

6. The method according to claim 1, further comprising estimating at least one of a CBL amplitude and a CBL attenuation.

7. The method according to claim 1, further comprising setting data of conditions in free-pipe and 100% cemented cases with respect to both of a plain casing model and a perforated casing model for the numerical modeling.

8. The method according to claim 1, further comprising detecting a casing-borne signal of waveforms of a plain casing model and a perforated casing model in both of free-pipe and 100% cemented cases.

9. The method according to claim 8, further comprising:
   computing a normalization factor using the E1-peak amplitude of waveforms of the plain casing model; and
   applying the normalization factor to the casing-borne signal of waveforms of the perforated casing model.

10. The method according to claim 1, wherein the casing is set a cement plug by at least one of a plug and abandon (P&A) operation and a perforate, wash and cement (PWC) operation.

11. The method according to claim 1, further comprising receiving at least one of parameters of the casing and parameters of operation with respect to the casing.

12. The method according to claim 1, further comprising cumulating the cement evaluation results and the parameters in a database, and assessing the parameters.

13. The method according to claim 1, further comprising providing the amplitude for identifying perforation parameters so as to minimize impact on CBL measurements.

14. The method according to claim 1, wherein the evaluation is an evaluation of gravel pack in the wellbore.

15. A system of model-based acoustic measurements for a perforated casing, comprising a computer apparatus and software instructions executable on the computer apparatus to:
   create an interpretation chart of acoustic measurements by a downhole tool in a wellbore using a numerical modeling, wherein the interpretation chart is an interpretation chart of cement bond log (CBL) measurements with respect to the perforated casing; and
   perform an evaluation with respect to the wellbore based on the interpretation chart.

16. The system according to claim 15,
   wherein the evaluation is a quantitative cement evaluation with respect to the perforated casing in the wellbore.

17. The system according to claim 15, the software instructions including an instruction to estimate at least one of a CBL amplitude and a CBL attenuation.

18. The system according to claim 15, the software instructions further including an instruction to set data of conditions in free-pipe and 100% cemented cases with respect to both of a plain casing model and a perforated casing model for the numerical modeling.

19. The system according to claim 15, the software instructions further including an instruction to detect a casing-borne signal of waveforms of a plain casing model and a perforated casing model in both of free-pipe and 100% cemented cases.

20. The system according to claim 19, the software instructions further including instructions to:
   compute a normalization factor using the casing-borne signal of waveforms of the plain casing model, and
   apply the normalization factor to the casing-borne signal of waveforms of the perforated casing model.

* * * * *